United States Patent
Torres et al.

(10) Patent No.: US 8,078,180 B2
(45) Date of Patent: Dec. 13, 2011

(54) SUBSCRIBER SERVER SYSTEM FOR A CELLULAR COMMUNICATION SYSTEM

(75) Inventors: Jose Miguel M. Torres, Madrid (ES); Miguel Angel Munoz, Madrid (ES); Luis F. Velarde, Madrid (ES)

(73) Assignee: Motorola Mobility, Inc., Libertyville, IL (US)

( * ) Notice: Subject to any disclaimer, the term of this patent is extended or adjusted under 35 U.S.C. 154(b) by 637 days.

(21) Appl. No.: 12/297,077

(22) PCT Filed: Mar. 19, 2007

(86) PCT No.: PCT/US2007/064278
§ 371 (c)(1),
(2), (4) Date: Oct. 14, 2008

(87) PCT Pub. No.: WO2007/124218
PCT Pub. Date: Nov. 1, 2007

(65) Prior Publication Data
US 2009/0280779 A1    Nov. 12, 2009

(30) Foreign Application Priority Data
Apr. 21, 2006   (GB) .................................. 0607884.4

(51) Int. Cl.
*H04Q 7/20* (2006.01)
(52) U.S. Cl. ..................... 455/445; 455/412.1; 455/411; 455/414.3; 455/450; 455/417; 370/352; 370/389; 370/397; 370/432; 709/203
(58) Field of Classification Search .................. 370/338, 370/352, 389, 397, 432, 203; 709/203; 455/412.1, 455/455, 414.3, 411, 445, 450, 417
See application file for complete search history.

(56) References Cited

U.S. PATENT DOCUMENTS

| | | | |
|---|---|---|---|
| 2004/0147242 A1* | 7/2004 | Pasanen et al. | 455/403 |
| 2005/0075109 A1 | 4/2005 | Neyret et al. | |
| 2005/0136926 A1* | 6/2005 | Tammi et al. | 455/435.1 |
| 2005/0278420 A1 | 12/2005 | Hartikainen et al. | |
| 2007/0002840 A1* | 1/2007 | Song et al. | 370/352 |
| 2007/0189279 A1* | 8/2007 | Thalanany et al. | 370/356 |

FOREIGN PATENT DOCUMENTS

| | | |
|---|---|---|
| EP | 1619854 A1 | 1/2006 |
| WO | 03081876 A1 | 10/2003 |

OTHER PUBLICATIONS

Chinese Office Action, The State Intellectual Property Office of the People's Republic of China, Jun. 21, 2011, all pages.

* cited by examiner

*Primary Examiner* — Patrick Edouard
*Assistant Examiner* — Fred Casca

(57) ABSTRACT

A subscriber server system 200 for a cellular communication system 100 comprises a subscriber data storage 205 which stores public identities associated with subscribers of the cellular communication system. A request processor 207 receives an identity information request message, such as a SIP OPTIONS message, from a remote station 101. The identity information request message comprises a first public identity for a subscriber of the cellular communication system. A public identity processor 209 determines a first set of public identities which comprises a plurality of public identities associated with the subscriber in response to the public identity. A message generator 211 generates an identity response message, such as a SIP 200OK message, comprising the first set of public identities. The identity response message is then transmitted to the first remote station 101.

8 Claims, 2 Drawing Sheets

SUBSCRIBER SERVER SYSTEM FOR A CELLULAR COMMUNICATION SYSTEM

FIELD OF THE INVENTION

The invention relates to a subscriber server system for a cellular communication system and in particular, but not exclusively, to a subscriber server system for an Internet Protocol Multimedia Subsystem (IMS) for a $3^{rd}$ Generation cellular communication system.

BACKGROUND OF THE INVENTION

Currently, the most ubiquitous cellular communication system is the 2nd generation communication system known as the Global System for Mobile communication (GSM). Further description of the GSM TDMA communication system can be found in 'The GSM System for Mobile Communications' by Michel Mouly and Marie Bernadette Pautet, Bay Foreign Language Books, 1992, ISBN 2950719007.

3rd generation systems have recently been rolled out in many areas to further enhance the communication services provided to mobile users. One such system is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876. The core network of UMTS is built on the use of SGSNs and GGSNs thereby providing commonality with GPRS.

In the future evolution of cellular communication systems, it is expected that these will increasingly be based on Internet Protocol (IP) traffic. For example, it is envisaged that a substantial part of the voice communication will be supported by Voice over IP (VoIP) traffic in the future. Accordingly, the $3^{rd}$ Generation Partnership Project (3GPP), which is responsible for standardising the $3^{rd}$ Generation cellular communication systems, has introduced a network architecture which supports IP traffic. This architecture is compatible with and supplements the traditional network architecture and is known as the IP Multimedia Subsystem (IMS).

The aim of IMS is not only to provide new services but to provide all the services, current and future, that the Internet provides. In addition, users have to be able to execute all their services when roaming as well as from their home networks. To achieve these goals, IMS uses open standard IP protocols, defined by the Internet Engineering Task Force (IETF). So, a multimedia session between two IMS users, between an IMS user and a user on the Internet, and between two users on the Internet is established using exactly the same protocol. Moreover, the interfaces for service developers are also based on IP protocols. This is why IMS truly merges the Internet with the cellular world; it uses cellular technologies to provide ubiquitous access and Internet technologies to provide appealing services.

In particular, IMS uses a VoIP implementation based on a 3GPP standardised implementation of the Session Initiation Protocol (SIP) and runs over the standard Internet Protocol (IP). Existing phone systems (both packet-switched and circuit-switched) are supported.

SIP is a standard for initiating, modifying, and terminating an interactive user session that involves multimedia elements such as video, voice, instant messaging, online games, and virtual reality. SIP is only used in setting up and tearing down voice or video calls. All voice/video communications are done over the Real-time Transport Protocol (RTP).

A goal for SIP was to provide a superset of the call processing functions and features present in the public switched telephone network (PSTN). As such, features that permit familiar telephone-like operations are present: dialing a number, causing a phone to ring, hearing ringback tones or a busy signal etc.

SIP also implements many more advanced call processing features. Furthermore, SIP is a peer-to-peer protocol. As such, it requires only a very simple (and thus highly scalable) core network with intelligence distributed to the network edge, embedded in endpoints (terminating devices built in either hardware or software). Many SIP features are implemented in the communicating endpoints.

IMS supports functionality for managing and controlling subscription information for the users of the system. Specifically, an IMS network comprises a Home Subscriber Server (HSS) which is a master user database that supports the IMS network entities that are actually handling the calls/sessions. These entities comprise the so-called Call Server Control Function (CSCF) elements. A CSCF also acts as a SIP Registrar and stores registration information (such public id, private id, contacts (the IP address of a device, capabilities)). It contains the subscription-related information (user profiles), performs authentication and authorization of the user, and can provide information about the physical location of user. An HSS may in many scenarios be considered to provide functionality equivalent to a GSM Home Location Register (HLR) and Authentication Center (AuC).

The IETF standards document RFC 3840 describes a mechanism which allows a network node to determine the capabilities of another subscriber. Specifically, the first node can transmit a SIP OPTIONS message to the Registrar Serving-CSCF (S-CSCF) with an identification of the public identity of the subscriber for which it is requesting information. In response, the S-CSCF (Registrar) retrieves the capability stored for that public identity (stored there at registration) and includes it in the SIP message 200OK which is then returned to the requesting node.

The subscriber may have a plurality of contacts (with different capabilities) or records associated with the same public identity. For example, the user may have different devices. SIP allows for the contact details of all the contacts to be provided in response to the OPTIONS message as well as the information of the capabilities of the contacts of the public identity. Thus, the mechanism described in RFC 3840 provides a way to let a node know about the capabilities of all the contacts belonging to a certain public identity.

However, the conventional SIP approach requires that the first node is aware of the public identity of the node(s) for which it is requesting information. Although this may be practical in some systems, it is disadvantageous in many cellular communication systems. Specifically, IMS allows a subscriber to have a plurality of public identities for example corresponding to different services and/or locations.

Furthermore, IMS provides another concept known as IMS subscription. This allows a group of subscribers to be linked to each other such that e.g. a common billing process is used for all subscribers of the group. For example, IMS allows the public identities of a family of subscribers to be linked and to have a single common billing process. However, in such systems, a node, such as a cellular user equipment intending to initiate a session with a specific subscriber, has to repeatedly transmit an OPTIONS message for each public identity in order to determine the capabilities available for contacting the subscriber (or group of subscribers). However, this is suboptimal and is in particular inconvenient, cumbersome, requires that all involved public identities are known by the requesting node, results in high levels of signaling and is resource demanding.

Hence, an improved system for obtaining information of subscribers would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a subscriber server system for a cellular communication system, the subscriber server system comprising: means for storing public identities associated with subscribers of the cellular communication system; means for receiving an identity information request message from a remote station, the identity information request message comprising a first public identity for a subscriber of the cellular communication system; determining means for determining a first set of public identities in response to the public identity, the first set comprising a plurality of public identities associated with the subscriber; generating means for generating an identity response message comprising an indication of the first set of public identities; means for transmitting the identity response message to the first remote station.

The invention may provide an improved subscriber server system. In particular, the subscriber server system may provide additional information in response to an information request message. The invention may in particular allow improved performance in systems allowing subscribers having multiple associated public identities. The invention may allow a substantially facilitated operation and may in particular allow a convenient way for remote stations to determine multiple public identities for a given subscriber. Specifically, the invention may allow a practical and/or low complexity means of providing information associated with a plurality of public identities (including the associated services) even if these are not all known to the remote station.

According to an optional feature of the invention, the generating means is arranged to include device capability data for each public identity of the identity response message.

The invention may allow improved information of the capabilities associated with a subscriber to be provided in an efficient manner. In particular, the invention may allow a single public identity to be used to determine all the capabilities that are associated with a subscriber (or subscriber group) rather than just the capabilities associated with the specific public identity. The feature may allow the remote station to efficiently select a suitable contact for the subscriber and may specifically select a device and/or public identity that can support the desired communication service.

In some embodiments the generating means may be arranged to include a service identity associated to each public identity of the identity response message.

According to an optional feature of the invention, the subscriber server system is a Session Initiation Protocol, SIP, subscriber server system.

The invention may provide an improved subscriber server system which is compatible with the requirements and characteristics of the Session Initiation Protocol (SIP). In particular, the subscriber server system may be arranged to communicate with the remote station using SIP messaging and signalling.

According to an optional feature of the invention, the determining means is arranged to include public identities of an implicit set to which the first public identity belongs in the first set.

This may allow improved performance, an increased user experience and/or facilitated implementation and/or operation.

According to an optional feature of the invention, the identity information request message is a SIP OPTIONS message.

This may allow improved performance, an increased user experience and/or facilitated implementation and/or operation. In particular, it may allow compatibility with current approaches and requirements for SIP signalling.

According to an optional feature of the invention, the identity response message is a SIP 200OK message.

This may allow improved performance, an increased user experience and/or facilitated implementation and/or operation. In particular, it may allow compatibility with current approaches and requirements for SIP signalling.

According to an optional feature of the invention, the generating means is arranged to add a number of private headers for indicating public identities of at least some of the first set of public identities.

This may provide an efficient way of including additional information while allowing backwards compatibility with SIP standards and/or equipment.

According to an optional feature of the invention, a format of the private headers corresponds to a format of a SIP CONTACT header of the SIP 200OK message.

This may allow facilitated implementation and/or operation.

According to an optional feature of the invention, the generating means is arranged to add a private header comprising an indication of the public identity and associated device capabilities for at least the public identities of the first set not being the first public identity.

This may allow improved performance, an increased user experience and/or facilitated implementation and/or operation. In particular, it may allow compatibility with current approaches and requirements for SIP signalling. The generating means may specifically include one header for each of the public identities except for the first public identity.

According to an optional feature of the invention, the generating means is arranged to include data for the first public identity in a CONTACTS header of the SIP 200OK message.

This may provide an efficient way of including additional information while allowing backwards compatibility with SIP standards and/or equipment. In particular, conventional SIP equipment not comprising information for processing information for a plurality of public identities may still decode the information for the first public identity.

According to an optional feature of the invention, the first public identity is an identity associated with the remote station.

The invention may provide an efficient way of a subscriber obtaining information of the public identities associated with it.

According to an optional feature of the invention, the identity information request message is a SIP REGISTER message.

This may allow improved performance, an increased user experience and/or facilitated implementation and/or operation. In particular, it may allow compatibility with current approaches and requirements for SIP signalling. The SIP REGISTER message may be a SIP REGISTER message with no contacts.

According to an optional feature of the invention, the subscriber server system is an Internet Protocol Multimedia Subsystem, IMS, subscriber server system.

The invention may provide an improved subscriber server system which is compatible with the requirements and characteristics of the IP Multimedia Subsystem as defined by the $3^{rd}$ Generation Partnership Projects (3GPP). The invention may in particular allow improved and/or facilitated functionality and/or services in a $3^{rd}$ Generation cellular communication system.

According to an optional feature of the invention, the determining means is arranged to include public identities of an IMS subscription set to which the first public identity belongs in the first set.

This may allow improved performance, an increased user experience and/or facilitated implementation and/or operation. In particular, it may allow a remote station to efficiently be provided with information of the public identities that are associated with all the subscribers of a given IMS subscription group.

According to an optional feature of the invention, the subscriber server system comprises a Home Subscriber Server, HSS, of an IP Multimedia Subsystem, IMS, of the cellular communication system.

The invention may allow an improved IMS operation for a cellular communication system.

According to an optional feature of the invention, the subscriber server system comprises a Serving-Call Server Control Function (S-CSCF).

The invention may allow improved S-CSCF functionality.

According to an optional feature of the invention, the cellular communication system is a Universal Mobile Telecommunication System, UMTS, cellular communication system.

The invention may allow improved and/or facilitated operation in a UMTS cellular communication system.

According to another aspect of the invention, there is provided a method of operation for a subscriber server system for a cellular communication system, the method comprising: storing public identities associated with subscribers of the cellular communication system; receiving an identity information request message from a remote station, the identity information request message comprising a first public identity for a subscriber of the cellular communication system; determining a first set of public identities in response to the public identity, the first set comprising a plurality of public identities associated with the subscriber; generating an identity response message comprising an indication of the first set of public identities; and transmitting the identity response message to the first remote station.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a $3^{RD}$ Generation cellular communication system comprising a SIP based IMS network. However, it will be appreciated that the invention is not limited to this application but may be applied to many other cellular communication s cellular communication systems.

Figure 1:
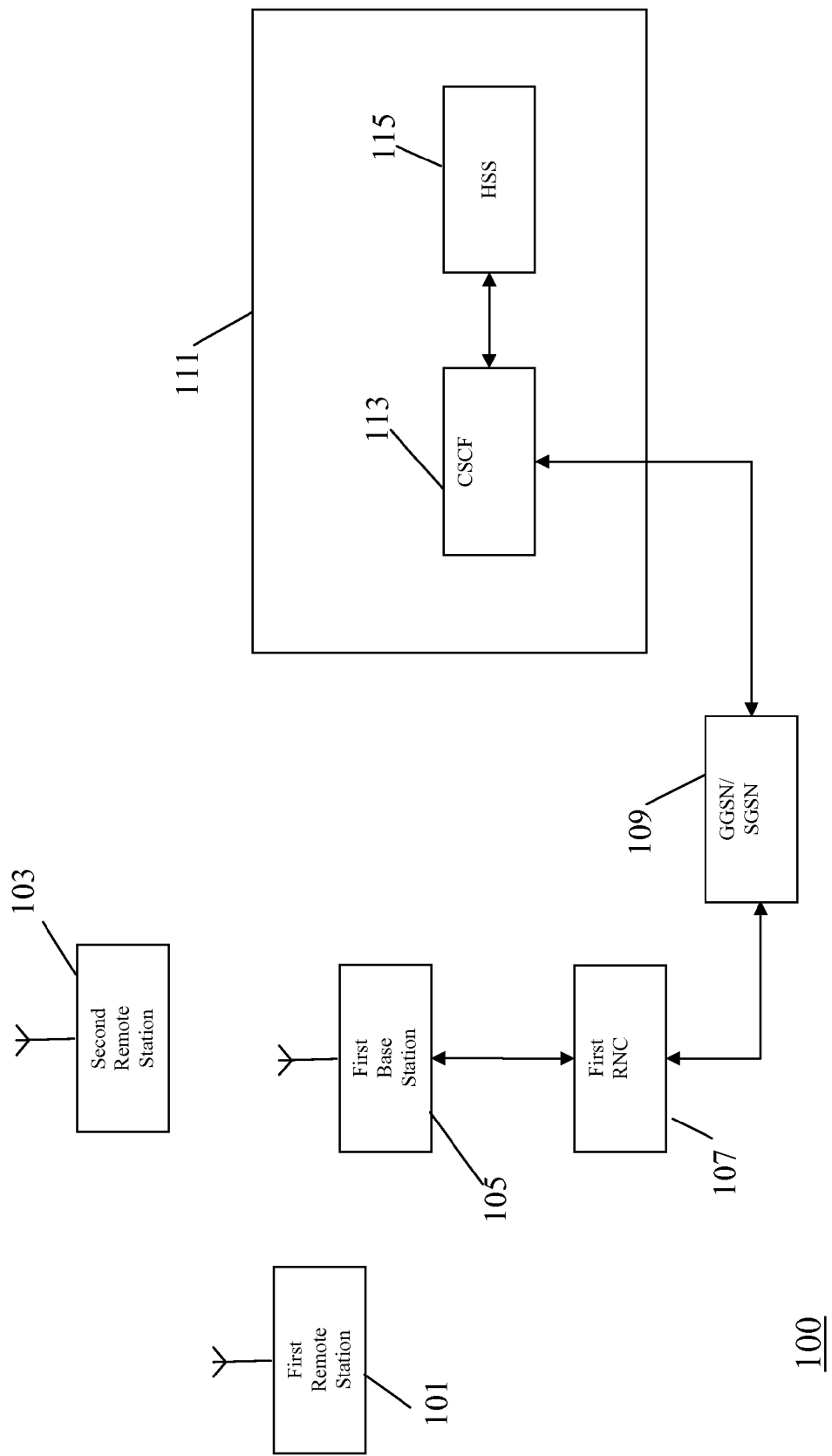
FIG. 1 illustrates an example of a cellular communication system in accordance with some embodiments of the invention.

FIG. 1 illustrates an example of a cellular communication system 100 in accordance with some embodiments of the invention. In the specific example, the cellular communication system is a UMTS system comprising an IMS network. For brevity and clarity the figure only illustrates examples of network elements required for the following description and it will be appreciated that a practical system typically will comprise other types of network elements as well as multiple instances of the illustrated network elements.

In a cellular communication system, a geographical region is divided into a number of cells each of which is served by a base station. The base stations are interconnected by a fixed network which can communicate data between the base stations. A remote station (e.g. a User Equipment (UE) or a mobile station) is served via a radio communication link by the base station of the cell within which the remote station is situated.

As a remote station moves, it may move from the coverage of one base station to the coverage of another, i.e. from one cell to another. As the remote station moves towards a base station, it enters a region of overlapping coverage of two base stations and within this overlap region it changes to be supported by the new base station. As the remote station moves further into the new cell, it continues to be supported by the new base station. This is known as a handover or handoff of a remote station between cells.

A typical cellular communication system extends coverage over typically an entire country and comprises hundreds or even thousands of cells supporting thousands or even millions of remote stations. Communication from a remote station to a base station is known as uplink, and communication from a base station to a remote station is known as downlink.

In the example of FIG. 1, a first remote station 101 and a second remote station 103 are in a first cell supported by a first base station 105.

The first base station 105 is coupled to a first RNC 107. An RNC performs many of the control functions related to the air interface including radio resource management and routing of data to and from appropriate base stations.

The first RNC 107 is coupled to a Gateway GPRS Support Node/Serving GPRS Support Node (GGSN/SGSN). Thus, for brevity and clarity, the network element 109 is considered to provide the functionality of both a GGSN and an SGSN for the first RNC 107.

A core network interconnects RNCs and is operable to route data between any two RNCs, thereby enabling a remote station in a cell to communicate with a remote station in any other cell. In addition, a core network comprises gateway functions for interconnecting to external networks such as the Public Switched Telephone Network (PSTN), thereby allowing remote stations to communicate with landline telephones and other communication terminals connected by a landline. Furthermore, the core network comprises much of the functionality required for managing a conventional cellular communication network including functionality for routing data, admission control, resource allocation, subscriber billing, remote station authentication etc.

As will be appreciated by the person skilled in the art, Serving GPRS Support Nodes (SGSN) and Gateway GPRS Support Nodes (GGSN) are included in a $3^{rd}$ Generation cellular communication system, such as UMTS, to provide a packet based fixed network communication. Specifically, an SGSN comprises functionality for routing data from the remote stations towards the desired destination and a GGSN comprises an interworking function for interfacing the core network to other networks. In the specific example, the GGSN/SGSN (henceforth referred to simply as a GGSN) 109 comprises an interworking function for interfacing the GPRS packet data network to an IP based network known as the IP Multimedia Subsystem (IMS) 111.

In the example, the GGSN 109 is coupled to a Call Session Control Function CSCF 113 which performs much of the IMS routing and management functionality for the communications of the remote stations 101, 103. It will be appreciated that a typical IMS network will comprise a large number of CSCF network elements and that only a single element is illustrated for clarity in FIG. 1. Furthermore, it will be appreciated that different types of CSCFs are typically present in an IMS network. Specifically, the CSFC 113 may be considered to represent the functionality typically provided by P-CSCFs (Proxy-CSCF), S-CSCFs (Serving CSCFs) and I-CSCFs (Interrogating-CSCFs). Specifically, an S-CSCF acts like SIP registrar and stores all registration information: public id, private id and contacts (remote station IP address, remote station capabilities).

The CSCF 113 is coupled to a Home Subscriber Server (HSS) 115. The HSS 115 comprises a database which stores information relating to the subscribers and services. Specifically, the HSS 115 comprises information of the public and private identities of the subscribers. It furthermore comprises information relating to the devices associated with the subscribers and may specifically comprise a list of the devices associated with each public identity as well as various data for these devices. Specifically, the HSS 115 comprises an Internet Protocol (IP) address for the individual devices. In addition, the HSS 115 may have information of the capabilities of the devices, such as an indication of which services it can support. The HSS also provides the traditional Home Location Register (HLR) and Authentication Centre (AUC) functions. This allows the user to access the packet and circuit domains of the network initially, via IMSI authentication.

When a remote station registers, the S-CSCF 113 accesses the HSS 115 and downloads subscriber profile info (public id, service, private id, IMS subscription . . . ) from this. Then the rest of the registration information (like contacts: remote station IP address, remote station capabilities) is stored directly in the S-CSCF (acting like SIP registrar).

The IMS network is an IP based network and the communication within the IMS network and between the GGSN 109 and the IMS network 111 uses the IP protocol. In particular, the Session Initiation Protocol (SIP) is used to initiate and manage multimedia services.

When a remote station attaches to the system, it initially performs a registration process where the remote station registers with a subscriber server system. The subscriber server system may be considered to correspond to the HSS 115 and/or may be considered to correspond to the functionality of both the HSS 115 and elements of the associated CSCF 113.

Figure 2:
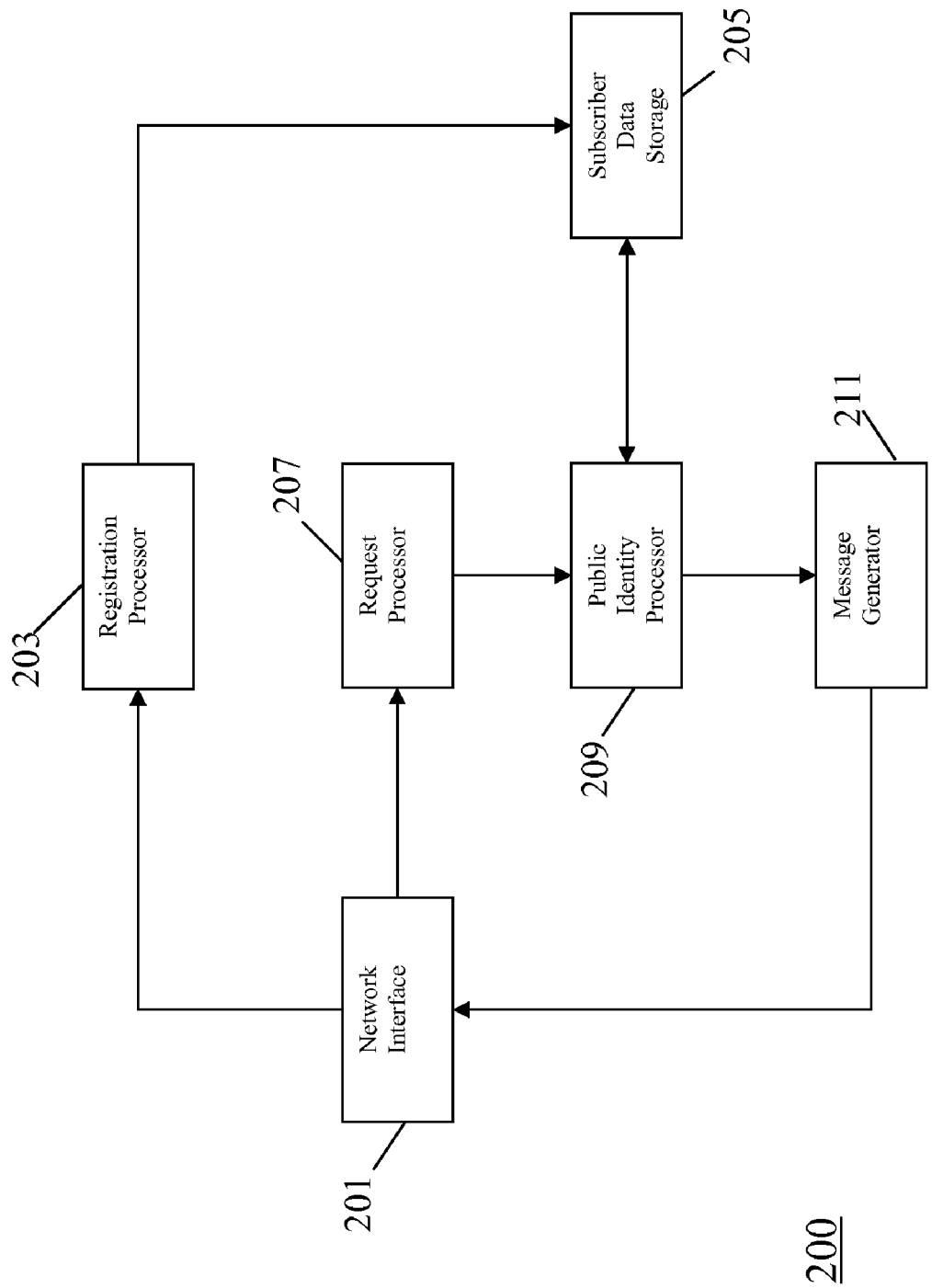
FIG. 2 illustrates an example of a subscriber server system in accordance with some embodiments of the invention.

FIG. 2 illustrates an example of a subscriber server system 200 in accordance with some embodiments of the invention. In a specific example, the subscriber server system 200 corresponds to the functionality of the S-CSCF 113 associated with the HSS 113 and/or can be considered to correspond to functionality comprised in the S-CSCF 113 as well as the HSS 113.

The subscriber server system 200 comprises a network Interface 201 which is arranged to communicate data with the network elements of the IMS network. Specifically, the network interface 201 may interface the subscriber server system 200 with CSCFs of the IMS network. The network interface 201 is coupled to a registration processor 203 which is furthermore coupled to a subscriber data storage 205. The subscriber data storage 205 stores the subscriber information including information of the public identities, devised contact addresses, device capabilities etc. The subscriber data storage 205 may be specifically comprise the HSS 115.

When a remote station, such as the first remote station 101, becomes active in the IMS network, it initially performs a registration operation wherein it registers with the serving subscriber server system for that remote station.

Specifically the first remote station 101 can transmit a REGISTER message to the subscriber server system 200. This message will comprise information of the remote station 101 and is fed to the registration processor 203 which proceeds to store the relevant information in the subscriber data storage 205. It will be appreciated that information for a given a remote station/subscriber is not received only from the first remote station but can for example be directly stored by a network operator. For example, a network operator may maintain a list of public identities, private identities and device contact addresses for each subscriber or group of subscribers in the subscriber data storage 205.

The following is an example of a SIP REGISTER message that may be transmitted from the first remote station 101 to the subscriber server system 200:

REGISTER sip:example.com SIP/2.0
From: sip:user@example.com;tag=asd98
To: sip:user@example.com
Call-ID: hh89as0d-asd88jkk@host.example.com
CSeq: 9987 REGISTER
Max-Forwards: 70
Via: SIP/2.0/UDP
host.example.com;branch=z9hG4bKnashds8
Contact: <sip:user@host.example.com>;audio;video
;actor="msg-taker";automata;mobility="fixed"
;methods="INVITE,BYE,OPTIONS,ACK,CANCEL"
Content-Length: 0

In response to receiving this message, the subscription server 200 registers the user with the public identity "user@example.com" and the provided contact information (device IP and capabilities).

In conventional SIP based systems, a remote station can obtain information of the capabilities of a second remote station by transmitting a SIP message known as the OPTIONS request message to the subscriber server system. The OPTIONS message will comprise the public identity of the second remote station. In response to the request message, the subscriber server system will return a message that comprises information of the contacts and capabilities for the requested public identity. The specific SIP message is known as the 200OK message.

A single public identity may be associated with a plurality of contacts (e.g. different devices) and the 200OK message may comprise information of all the contacts for the requested public identity. Thus, a remote station may be provided with information of the capabilities of all the contacts associated with a certain public identity of another remote station. This approach is described in RFC 3840 issued by the Internet Engineering Task Force (IETF).

The subscriber server system 200 of FIG. 2 provides enhanced functionality with respect to the conventional approach described in RFC 3840. In particular, the subscriber server system 200 of FIG. 2 comprises functionality for determining all the public identities that are associated with the subscriber if the requested public identity. These further public identities can for example be the public identities which form part of an implicit set of public identities for the specific subscriber and/or may be public identities which are associated with other subscribers being part of a defined group of subscribers.

The subscriber server system 200 can then informed the requesting remote station of appropriate information related not only to the requested public identity but also to all other public identities that are associated with the subscriber of the requested public identity. Thus, the subscriber server system provides for a system where e.g. an IMS call initiating remote station can know all the public identities, contacts and capabilities of a callee remote station before initiating a call. It can then choose the public identity and contact that is best suited for the specific service.

Specifically, the subscriber server system 200 comprises a request processor 207 which is coupled to the network interface 201 and which is arranged to receive an identity information request message from a remote station. The identity information request message comprises a first public identity for a subscriber. Specifically, the first remote station 101 can transmit a SIP OPTIONS request message which contains a single known public identity of the second remote station 103. The request processor 207 receives this message and extracts the public identity. The SIP OPTIONS messages can follow the following format:

OPTIONS <tel:number> or <sip:number;user=phone> or <sip:uri>

Such as for example:

OPTIONS sip: user1@motorola.com where user1@motorola.com is the public identity of the second remote station 103.

The request processor 207 is coupled to a public identity processor 209 which is further coupled to the subscriber data storage 205. The public identity processor 209 receives the public identity from the OPTIONS message from the request processor 207 and accesses the subscriber data storage 205 to retrieve all information stored therein for this public identity.

The retrieved information includes a list of all of the public identities which are linked to the requested public identity. In addition, it comprises information of all the contacts for all of the public identities as well as the capabilities of each of these contacts. Thus, the retrieved information comprises complete data for all the possible ways of accessing the subscriber of the requested public identity.

The data indicating all the associated public identities, contact and capabilities are fed to a message generator 211 coupled to the public identity processor 209. The message generator 211 generates a response message which comprises this information. The message generator 211 is furthermore coupled to the network interface 201 and is arranged to transmit the response message to the first remote station 101 via the IMS network.

Specifically, the message generator 211 may generate a 200OK message containing the information of how the subscriber can be accessed. This 200OK message can then be transmitted to the first remote station 101. In this way, the first remote station 101 will be provided with complete information of all the possible ways in which the subscriber of the second remote station 103 can be accessed. The first remote station 101 (or the user thereof) can then proceed to select the most appropriate contact for the specific intended service.

For example, if the first remote station 101 is seeking to transmit a video message to the subscriber of the second remote station 103, it may transmit an OPTIONS message comprising the public identity of the second remote station 103 to the subscriber server system 200. The 200OK message returned may indicate that the second remote station 103 is not capable of supporting video messaging but that another device associated with another public identity of the subscriber of the second remote station 103 is capable of supporting such a message. For example, the subscriber of the second remote station 103 may have a personal computer which can receive video messages at home. The first remote station 101 can then proceed to transmit the video message to the public identity of the personal computer rather than the second remote station 103.

In some embodiments, the subscriber data storage 205 may only comprise information for the public identities which belong to the individual subscriber. For SIP systems this set of public identities are known as an implicit set and thus in some embodiments the subscriber server system 200 may provide contact details and capabilities associated with all the public identities of the implicit set.

IMS Systems furthermore provides a more flexible and advanced subscriber management than conventional SIP systems. Specifically, IMS networks allow a set of subscribers to be linked together to form an IMS subscription set. For example, a family may comprise a plurality of subscribers which are treated as a single subscriber from a billing point of view. The subscribers may accordingly form an IMS subscription set.

In some embodiments, the subscriber data storage 205 may thus comprise information of the public identities associated with all the subscribers of an IMS subscription set. Thus, the response message (e.g. the 200OK message) can comprise information of the contact details and capabilities associated with all the public identities of all the subscribers in the IMS subscription set. This may provide further flexibility to the calling remote station. For example, if a video message cannot be transmitted to the intended subscriber, it may instead be transmitted to a public identity of the partner of the intended subscriber if that person has a contact supporting video messaging.

In some embodiments, the additional information relating to the plurality of public identities is transmitted by including private headers in the response message. Specifically, for a 200OK message, one or more private headers may be included which contains the information relating to the public identities which were not included in the OPTIONS message.

In particular, in some embodiments the message generator 211 can include a new private header for each of the additional public identities. In a conventional 200OK message, the details relating to the requested public identity is included in the CONTACTS header. In the subscriber server system 200, the message generator 211 may continue to include the information relating to the requested public identity in the CONTACTS header in order to provide compatibility with existing systems and functionality. However, in addition one or more private headers are included in the 200OK message to provide the information relating to the additional public identities.

In particular, the message generator 211 can include one private header for each additional public identity. Each of these private headers may use the same format as that used for the CONTACTS header in order to facilitate decoding at the receiver. Each of the private headers may thus contain an indication of the public identity, the possible contacts and the capabilities associated with each of these contacts.

Thus, using such private headers (henceforth denoted P-CONTACT headers), the caller remote station will be able to obtain all the contacts/capabilities information of the callee remote stations in the 200OK message. In order to maintain backwards compatibility with existing SIP contact header usage (as described in RFC 3261 and RFC 3840), the contacts and capabilities of the requested public identity (Address Of Record) will be returned as part of the CONTACT header while the contacts and capabilities of the other public identities will be returned in the P-CONTACT header. This new header (P-CONTACT) will have the same tags as the SIP contact header plus a new tag to identify the public identity that the contact/capabilities information refers to.

An example of a 200OK message in accordance with the described approach is the following:

200OK
   Contact: < >;video;audio;im
   P-contact: sip: user2@motorola.com;video;audio;im
   P-contact: sip: user3@motorola.com;audio;PoC
   P-contact: sip: User4@motorola.com;video;fax
   P-contact: tel: +442222222; audio In the specific example, "Contact" will be used for user1@motorola.com (the requested public identity), and P-contact headers are used to include all the public identities that are associated therewith (e.g. which belong to the implicit set and/or the IMS subscription of the requested identity).

In SIP systems, headers which are not understood by a receiving entity are simply ignored. Accordingly, the above described approach allows backwards compatibility as nodes not comprising functionality for interpreting the additional information will simply ignore this and operate as in a conventional system.

The above description focuses on a situation where a remote station obtains information relating to other subscribers in order to make a call. However it would be appreciated that the described functionality can be used for many other purposes.

For example, a given remote station may transmit an identity information request message which comprises the remote stations own public identity. This identity information request message may for example be an OPTIONS request message comprising the public identity of the requesting remote station or may for example be a SIP REGISTER message transmitted for the remote station. In response, the subscriber server system 200 will return a 200OK message that indicates all the public identities associated with the subscriber, such as all the public identities of the implicit set and/or of the IMS subscription set, as well as the contacts and capabilities for these public identities. Thus, this approach will provide a practical, low complexity and easy way of a subscriber obtaining information of the subscription information currently registered for him.

In some embodiments, the provision of information of other public identities may be restricted. For example, a subscriber could restrict the available information to be provided to some users but not to others. For example, a user may control a white list (containing an identification of users that may be provided with the information of other public identities) and a black list (containing an identification of users that are not allowed to receive information of other public identities) at the subscriber server 200.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A subscriber server system for a cellular communication system, the subscriber server system comprising:
   means for storing public identities associated with subscribers of the cellular communication system;
   means for receiving an identity information request message from a remote station, the identity information request message comprising a first public identity for a subscriber of the cellular communication system;
   determining means for determining a first set of public identities in response to the public identity, the first set comprising a plurality of public identities associated with the subscriber;
   generating means for generating an identity response message comprising an indication of the first set of public identities; and
   means for transmitting the identity response message to the remote station;
   wherein the generating means is arranged to add a number of private headers for indicating public identities of at least some of the first set of public identities; and
   wherein the generating means is arranged to add a private header comprising an indication of the public identity and associated device capabilities for at least the public identities of the first set not being the first identity.

2. The subscriber server system of claim 1 wherein the generating means is arranged to include device capability data for each public identity of the identity response message.

3. The subscriber server system of claim 1 wherein the determining means is arranged to include public identities of an implicit set to which the first public identity belongs in the first set.

4. The subscriber server system of claim 1 wherein the subscriber server system is a Session Initiation Protocol, SIP, subscriber server system, and wherein the identity information request message is a SIP OPTIONS message.

5. The subscriber server system of claim 1 wherein the first public identity is an identity associated with the remote station.

6. The subscriber server system of claim 1 wherein the subscriber server system is an Internet Protocol Multimedia Subsystem, IMS, subscriber server system, and wherein the determining means is arranged to include public identities of an IMS subscription set to which the first public identity belongs in the first set.

7. The subscriber server system of claim 1 wherein the subscriber server system comprises a Serving-Call Server Control Function (S-CSCF).

8. A method of operation for a subscriber server system for a cellular communication system, the method comprising:

storing public identities associated with subscribers of the cellular communication system;

receiving an identity information request message from a remote station, the identity information request message comprising a first public identity for a subscriber of the cellular communication system;

determining a first set of public identities in response to the public identity, the first set comprising a plurality of public identities associated with the subscriber;

generating an identity response message comprising an indication of the first set of public identities; and transmitting the identity response message to the remote station;

wherein generating adds a number of private headers for indicating public identities of at least some of the first set of public identities; and wherein generating adds a private header comprising an indication of the public identity and associated device capabilities for at least the public identities of the first set not being the first identity.

* * * * *